United States Patent [19]

Metivaud et al.

[11] Patent Number: 5,261,983
[45] Date of Patent: Nov. 16, 1993

[54] SHEATH FOR INSULATING A VOLUME FROM THE ENVIRONMENT OUTSIDE IT, AND METHOD OF MAKING SUCH A SHEATH

[75] Inventors: Guy Metivaud, Talence; Jean-Claude Decidour, Castelnau de Medoc, both of France

[73] Assignee: Societe Anonyme dite: Aerospatiale Societe Nationale Industrielle, France

[21] Appl. No.: 901,657

[22] Filed: Jun. 18, 1992

[30] Foreign Application Priority Data

Jun. 28, 1991 [FR] France ................... 91 08038

[51] Int. Cl.⁵ .................. B32B 31/18; B32B 1/10
[52] U.S. Cl. ..................... 156/191; 156/193
[58] Field of Search ............. 156/189, 191, 193

[56] References Cited

U.S. PATENT DOCUMENTS 1,499,774  7/1924  Headson .................. 156/193

FOREIGN PATENT DOCUMENTS 1814042  7/1970  Fed. Rep. of Germany.
7908490  8/1979  Fed. Rep. of Germany.
8309223  7/1983  Fed. Rep. of Germany.

*Primary Examiner*—Alexander S. Thomas
*Attorney, Agent, or Firm*—Marshall, O'Toole, Gerstein, Murray & Borun

[57] ABSTRACT

A sheath for insulating a volume that optionally contains an object is made of a resilient material and it has a join plane which is shaped to constitute a baffle.

10 Claims, 3 Drawing Sheets

SHEATH FOR INSULATING A VOLUME FROM THE ENVIRONMENT OUTSIDE IT, AND METHOD OF MAKING SUCH A SHEATH

The present invention relates to a sheath for insulating a volume from the environment outside it, and also to a method of making such a sheath. It is equally intended for preventing said volume having an influence on said environment, and for preventing said environment acting on said volume.

BACKGROUND OF THE INVENTION

Thermal insulation sheaths having inside volumes that contain ducts are already known, said sheaths being constituted by sleeves of thermally insulating resilient foam material. Such sheaths serve to prevent heat being transmitted via the environment to said ducts, and mainly, when said ducts convey a hot fluid, they prevent heat being radiated by said ducts to the outside thereof. This avoids heat being lost from said hot fluid.

In such known resilient sleeves, a longitudinal join plane is provided as determined by a radial slit. Thus, sheaths can be put into place on ducts, and conversely sheaths can be removed from said ducts, by resiliently separating the lips of said radial slit to enable the ducting for protection to be passed therethrough.

However, with such known sheaths, said radial slit constitutes a weak point in the insulation between said ducts and their environment. Heat can easily pass through such a sheath surrounding ducting even if the slit appears to be closed. In addition, in the event of a fire occurring in said outside environment, the fire or the resulting flames can reach and possibly destroy said ducting (particularly at joints between lengths of ducting) by passing through said slit, even if the material from which the sheath is made stands up well to fire and to flames.

An object of the present invention is to remedy this drawback.

SUMMARY OF THE INVENTION

To this end, according to the invention, a sheath for insulating a volume from the environment outside it, the sheath comprising a longitudinal slit defining a join plane and being made of an elastically deformable material suitable for providing said insulation, is remarkable in that said join plane forms a baffle whose section includes at least one intermediate portion extending generally at least substantially transversely to the thickness of the wall of said sheath, and two end lines extending at least substantially parallel to said thickness of the wall of said sheath, said end lines connecting respective ends of said intermediate portion to the outside surface and to the inside surface of said sheath.

Because of the special join plane of the invention, the weak point of the installation as constituted by the join plane in known sheaths is thus eliminated.

Because the material from which said sheath is made is resilient, the lips of the slit press against each other spontaneously to close said sheath. However, in some cases, it may be advantageous to provide forced application of said lips against each other. To this end, the facing faces of said lips, and in particular their portions corresponding to said intermediate portion of the join plane, may be fixed to each other e.g. by gluing, or they may be provided with releasable fastening means. Such means may be constituted, for example, by rapid fastening means using cooperating hooks and loops, e.g. of the type known under the trademark Velcro.

Furthermore, the intermediate portion of said join plane need not be continuous, but may be constituted by at least two parts extending generally at least substantially transversely relative to the thickness of the wall of said sheaths, disposed at different levels, and connected together by a junction line extending at least substantially parallel to the thickness of the wall of said sheath.

To make an insulating sheath of the present invention, it is possible:

to make a mandrel whose outside shape corresponds to the volume to be insulated;

to apply on said mandrel successive layers of a flexible material impregnated with a polymerizable binder that has resilient properties after polymerization;

to interpose at least one separator between the successive layers of said flexible material, the thin section of said separator corresponding to said intermediate portion of the join plane, said separator being made of a material to which said polymerizable binder does not adhere;

to polymerize said binder;

to form cuts through the thickness of said layers and on either side of said separator, the cuts corresponding to respective end lines of the join plane; and to remove said separator and to disengage said sheath from said mandrel by resiliently separating the lips formed in this way.

It may be observed that because the sheath is separated from the mandrel by resiliently separating the lips of said sheath, the sheath may be of any desired shape or section.

Preferably, the cut corresponding to said end line connecting said intermediate portion to the outside surface of the sheath is made first, said separator is removed, and then the cut corresponding to said end line connecting said intermediate portion to the inside surface of said sheath is made.

When the said intermediate portion of the join plane includes at least two parts extending generally at least substantially transversely relative to the thickness of the wall of said sheath, and interconnected in pairs by respective junction lines extending at least substantially parallel to said thickness, it is possible:

to interpose at least two separators between the successive layers of said flexible material, the thin sections of said separators corresponding to respective parts of said intermediate portion;

then, after polymerizing the binder, to form cuts corresponding respectively to said end lines and to said junction lines of the section of the join plane.

For reasons of convenience, it is then advantageous:

to begin by forming the cut which corresponds to said end line connecting the first of said parts to the outside surface of the sheath;

to remove the first separator;

to form the cut corresponding to said junction line between said first and second parts;

to remove the second separator; and to successively and analogously form the cuts corresponding to the other junction lines and remove any possible third to last separators, and then form the cut corresponding to said end line connecting the last of said parts to the inside surface of the sheath.

In a variant implementation, it is possible:

to make a mandrel whose outside shape corresponds to the volume to be insulated;

to apply on said mandrel successive layers of a flexible material impregnated with a polymerizable binder that has resilient properties after polymerization;

to interpose at least one separator between the successive layers of said flexible material, the thin section of said separator corresponding to said intermediate portion of the join plane, the said separator being constituted by two co-operating layers of rapid fastening means having co-operating loops and hooks;

to polymerize said binder; and to form cuts corresponding respectively to said end lines of the section of the join plane, on either side of said separator.

Thus, after polymerization of the binder, each layer of the rapid fastening means is secured to one of the lips of the slit in the sheath, such that such lips are fixed to each other by said rapid fastening means. The lips can thus be separated from each other at will by separating the two layers of said rapid fastening means, or else they can be fixed together thereby.

Preferably, the cut corresponding to said end line connecting said intermediate portion to the outside surface of the sheath is made first, the two layers of the rapid fastening means are separated from each other, and then the cut corresponding to said end line connecting said intermediate portion to the inside surface of said sheath is made.

When said intermediate portion of the join plane includes at least two parts generally extending at least substantially transversely relative to the thickness of the wall of said sheath and interconnected in pairs by respective junction lines extending at least substantially parallel to said thickness, it is possible, in a manner similar to that described above:

to interpose at least two separators between the successive layers of said flexible material, the thin sections of said separators corresponding to respective parts of said intermediate portion, each separator being constituted by two cooperating layers of rapid fastening means having cooperating loops and hooks;

then, after polymerizing the binder, to form cuts corresponding respectively to said end lines and to said junction lines of the section of the join plane.

For reasons of convenience, it is then advantageous:

to begin by forming the cut which corresponds to said end line connecting the first of said parts to the outside surface of the sheath;

to separate the layers of the first separator;

to form the cut corresponding to said junction line between said first and second parts;

to separate the layers of the second separator;

to successively and analogously form the cuts corresponding to the other junction lines and to separate any possible third to last separators; and then to form the cut corresponding to said end line connecting the last of said parts to the inside surface of the sheath.

The sheath of the present invention insulates its inside volume from the environment surrounding it. If it is tubular in shape, it thus itself constitutes a duct. In which case, it is advantageous for the lips of the slit to be secured together, in particular by gluing, as mentioned above.

However, the sheath of the present invention may also be used as a protective sheath for protecting an object whose volume corresponds at least approximately to the inside volume of said sheath. The sheath is then installed around said object by separating the lips of said slit.

When in position on such an object to be protected, said lips must be pressed against each other to form a join plane baffle and to provide maximum insulation. To do this, it is essential for the outside shape of the mandrel to be at least equal to that of the object to be protected so as to avoid said lips gaping apart.

The outside shape of the mandrel is preferably identical to that of the object to be protected so that the sheath fits exactly on said object.

When the sheath of the invention is intended to protect its inside volume or the object it contains from flames, it is advantageous for the flexible material to be formed by a mat made up of a plurality of superposed layers of cloth made of carbonizable oxidized organic fibers, with at least one face of said mat being covered with a silicone-based binder. Such a material is described in detail in French patent application No. 90 10518 filed Aug. 21, 1990, with the binder then advantageously being the binder described in Document FR-A-2 632 866.

The flexible material may be applied to the mandrel by any conventional means, in particular by winding, draping, etc.

BRIEF DESCRIPTION OF THE DRAWINGS

Embodiments of the invention are described by way of example with reference to the accompanying drawings, in which.

DETAILED DESCRIPTION

The figures of the accompanying drawings show clearly how the invention can be implemented. In the figures, identical references designate items that are identical or similar.

Figure 1:
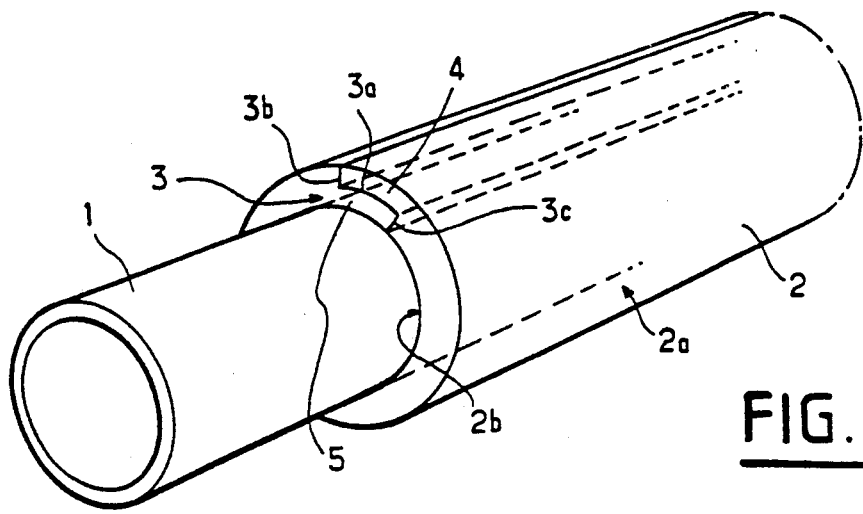
FIG. 1 is a diagrammatic perspective view of a length of cylindrical ducting provided with an insulating and protective sheath of the present invention.

In the embodiment of the invention shown in FIG. 1, an object to be insulated from its environment is constituted by cylindrical ducting 1. To this end, the ducting 1 is covered by a sheath 2 of resilient material suitable for protecting the ducting 1 against external attack (fire, flame, heat transmission, etc. . . . ) and/or for protecting the environment of said ducting against a hot fluid flowing in the ducting 1.

As can be seen in the figure, the sheath 2 includes a longitudinal slit defining a join plane 3 having an intermediate portion 3a that extends at least substantially transversely relative to the thickness of the wall of the sheath 2, together with two end lines 3b and 3c that extend at least substantially parallel to the thickness of the wall of the sheath 2 and that connect the ends of the intermediate portion 3a respectively to the outside surface 2a and to the inside surface 2b of said sheath 2.

When in position on the ducting 1, the lips 4 and 5 of the sheath 2 are pressed against each other to form said join plane 3.

To make the sheath 2 shown in FIG. 1, a cylindrical mandrel 6 is made whose outside diameter is not less than, and is preferably equal to, the outside diameter of the ducting 1.

Successive layers 7 of the material making up the sheath 2 are applied by any conventional method onto the mandrel 6, said material being flexible and being impregnated with a polymerizable binder having resilient qualities once polymerized.

Figure 2A:
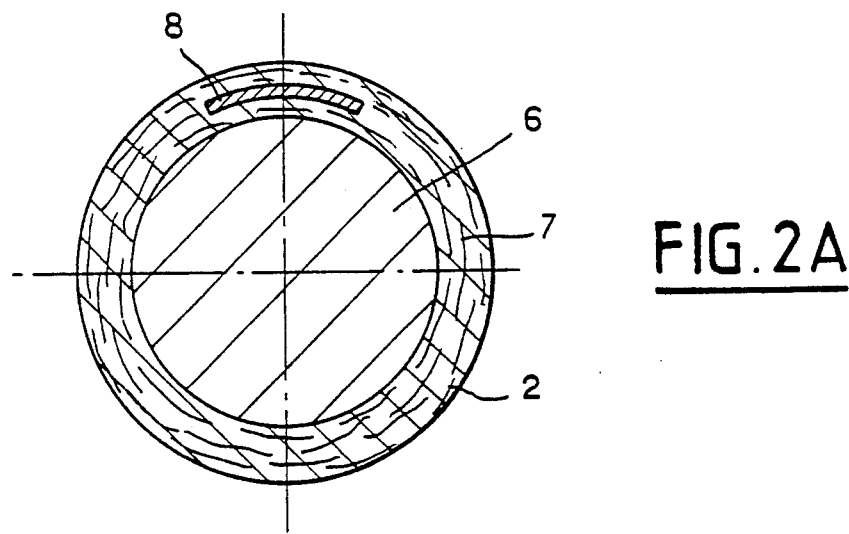
FIGS. 2A to 2E are diagrammatic cross-sections showing the method of manufacturing the sheath shown in FIG. 1.

While the successive layers 7 are being applied, a thin separator 8, e.g. constituted by a curved metal strip on which said binder does not adhere (FIG. 2A) is interposed, e.g. at half the thickness of the wall of the sheath 2.

When the desired thickness for the successive superposed layers 7 has been reached, the said binder is polymerized.

Figure 2B:
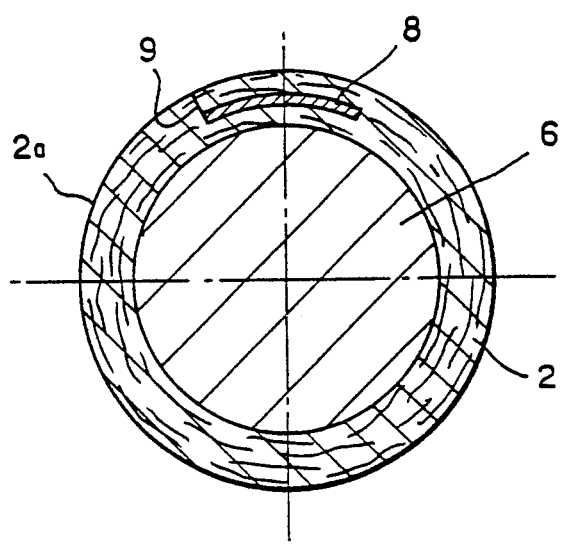

Thereafter, a longitudinal cut 9 (corresponding to the line 3b) is made so as to connect one of the lateral ends of the separator 8 to the outside surface 2a of the sheath 2 (FIG. 2B).

Figure 2C:
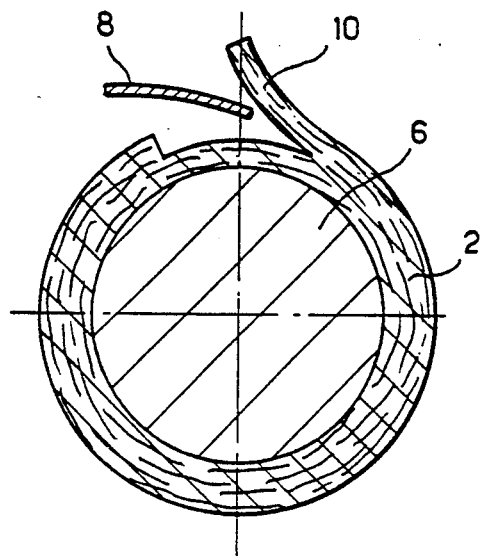

It is then possible to remove the separator 8 (FIG. 2C) by resiliently lifting the tongue of material 10 formed in this way by the material that overlies the separator 8.

Figure 2D:
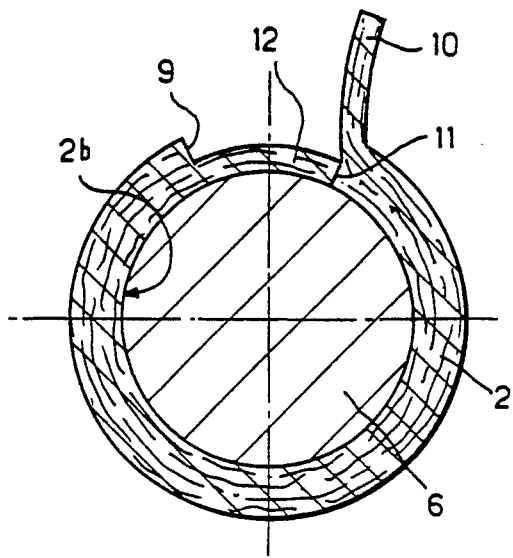

While holding up said tongue 10, it is also possible to form a longitudinal cut 11 (corresponding to the line 3c) thereby connecting the base of the tongue 10 to the inside surface 2b of the sheath 2 (FIG. 2D).

Figure 2E:
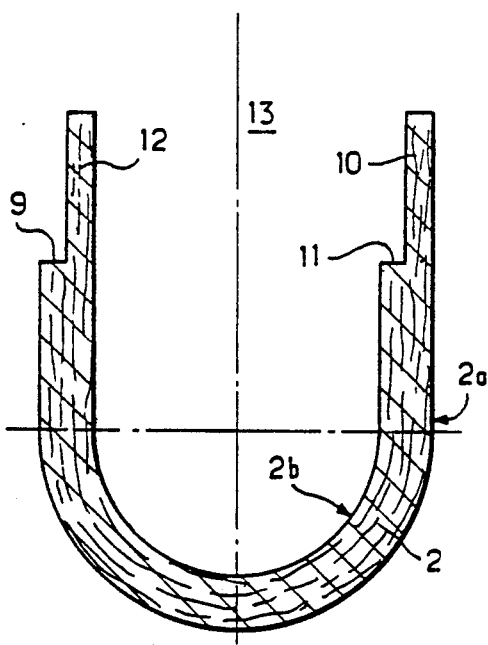

The tongue 12 (formed by the sheath material 2 that was initially disposed between the separator 8 and the mandrel 6) can then be resiliently raised, thereby separating the lips 4 and 5 of the sheath 2 (which lips are respectively formed by the tongue 12 and the line of cut 9, and by the tongue 10 and the line of cut 11), thereby forming a wide opening 13 by elastic deformation of the sheath 2 (FIG. 2E), through which opening the mandrel 6 can be extracted.

To install the sheath 2 on the ducting 1, it suffices merely to insert said ducting through the wide opening 13 after separating the lips 4 and 5 in the manner described above for extracting the mandrel 6. When the lips 4 and 5 are released, they press resiliently against each other to form the join plane 3.

Figure 3:
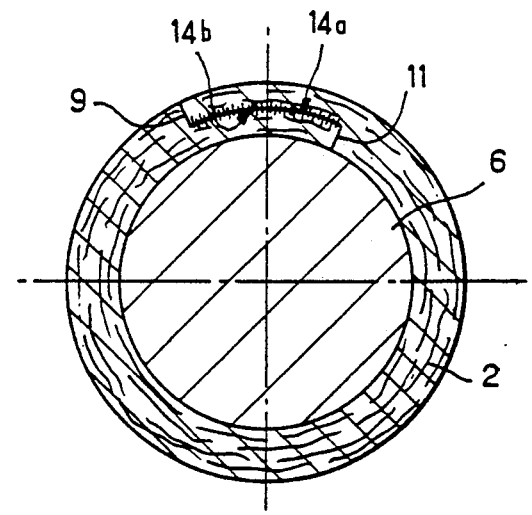
FIG. 3 is a diagrammatic cross-section showing a variant embodiment of the sheath of FIG. 1.

FIG. 3 shows a variant embodiment in which the separator 8 is replaced by two cooperating layers 14a and 14b of a rapid fastener having cooperating loops and hooks, the layers being secured to respective facing faces of the tongues 10 and 12. Thus, the intermediate portion 3a of the join plane 3 may be fixed with the tongues 10 and 12 being releasable fixed together. Under such circumstances, to make the cut 11, the two cooperating layers 14a and 15b of the separator are separated by lifting the tongue 10 (as in FIG. 2D) after the cut 9 has been made.

Figure 4A:
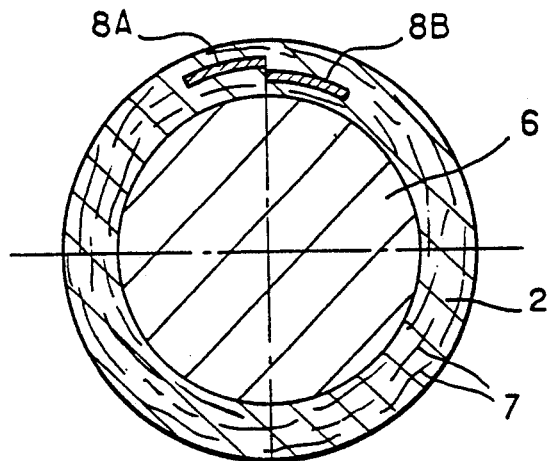
FIGS. 4A, 4B, and 4C are diagrammatic cross-sections showing variants of the method of manufacturing another embodiment of the sheath of the present invention.

In the variant embodiment of FIG. 4A (which corresponds to FIG. 2A), the single separator 8 is replaced by two adjacent individual separators 8A and 8B which are offset through the thickness of the wall of the sheath 2.

Figure 4B:
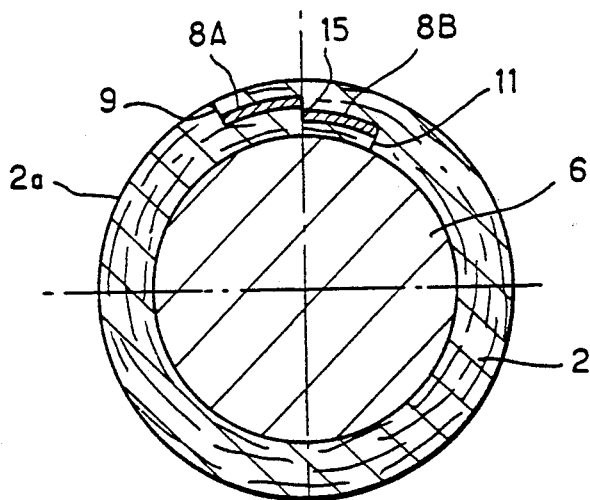
Figure 4C:
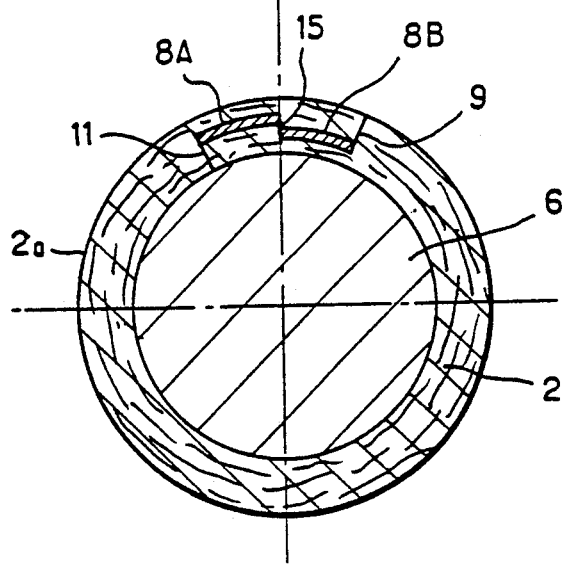

As shown in FIGS. 4B and 4C, the cut 9 is then made between the outside surface 2a of the sheath 2 and the lateral end of the separator 8A (the shallower separator) or 8B (the deeper separator) that is furthest from the other separator, and the cut 11 is then made between the inside surface 2b of the sheath 2 and the lateral end of the separator 8B or 8A that is furthest from the other separator.

In addition, an additional transverse cut 15 extending longitudinally is made between the facing edges of the separators 8A and 8B, thereby interconnecting said separators 8A and 8B.

In the two cases shown in FIGS. 4B and 4C, in a manner that follows on clearly from the above description, the cut 9 is made first, then the tongue thus formed between the outside surface 2a and the corresponding separator 8A or 8B is lifted to enable the cut 15 to be made, after which by lifting the larger tongue delimited between the outside surface 2a and both separators 8A and 8B, the cut 11 is made. A join plane is thus obtained whose intermediate portion 3a is constituted by two parts (corresponding to separators 8A and 8B respectively), each generally extending at least substantially transversely to the thickness of the wall of the sheath 2, disposed at different levels, and connected to each other by a junction line (cut 15) extending at least substantially parallel to the thickness of the wall of said sheath. The sheath 2 is easily removed from the mandrel 6 and placed on ducting 1 in the manner described above.

Thus, because of the present invention, the sheath 2 is provided with a baffle-forming join plane 3, thereby reinforcing the protection of the ducting 1 at the join plane. The shape of the baffle may be simple (FIGS. 1 and 3) or more complex (FIGS. 4B and 4C).

It will readily be understood that instead of using two separators 8A and 8B, it is possible to use a plurality of separators 8i (not shown, but with i=1 to n), disposed at different depths in the wall of the sheath 2 and interconnected in pairs by respective cuts 15. The cut 9 is made first, followed by the various cuts 15, and finally the cut 11. The shape of the resulting baffle is more complex and the baffle is therefore more effective.

In addition, instead of the separators 8A and 8B or 8i, it is naturally possible to use two or n separators similar to the separator 14a, 14b. The cuts 15 and the cut 11 are then made in succession, after successive opening of different separators 14a, 14b.

In the figures, the thicknesses of the separators 8, 8A, 8B, and 14a, 14b have been exaggerated for reasons of clarity.

Naturally, if the ducting 1 is very long, the sheath 2 may be made up of a plurality of successive lengths whose adjacent ends are interfitted. To this end, inside and outside shoulders may be provided at said ends to form male ends and female ends. Such male and female ends may optionally be made by including annular separators in the thickness of said ends (like the separator 8) and by removing the portion of the sheath 2 overlying or underlying such an annular separator. Thus, if the portion of sheath 2 that is removed lies outside the separator, then a male end is obtained. In contrast, if the portion of sheath 2 that is removed lies inside the separator, then a female end is obtained.

It will also readily be understood that if the ducting 1 of FIG. 1 is omitted, then the sheath 2 constitutes on a duct that insulates its inside volume from the environment outside the said sheath. Thus, particularly when the lips of the slit are fastened together, the sheath may act as an insulating duct.

We claim:

1. A method of making a sheath for insulating a volume from the environment outside it, the sheath comprising a longitudinal slit defining a join plane, said join plane forming a baffle whose section includes at least one intermediate portion extending generally at least substantially transversely to the thickness of the wall of said sheath, and two end lines extending at least substantially parallel to said thickness of the wall of said sheath, said end lines connecting respective ends of said intermediate portion to the outside surface and to the inside surface of said sheath, wherein the method comprises the steps of:

making a mandrel whose outside shape corresponds to the volume to be insulated;
  applying on said mandrel successive layers of a flexible material impregnated with a polymerizable binder that has resilient properties after polymerization;
  interposing at least one separator between the successive layers of said flexible material, said separator having a thin section corresponding to said intermediate portion of the join plane, said separator being made of a material to which said polymerizable binder does not adhere;
  polymerizing said binder;
  forming cuts through the thickness of said layers and on either side of said separator, the cuts corresponding to respective end lines of the section of the join plane; and
  removing said separator and disengaging said sheath from said mandrel by resiliently separating the lips formed in this way.

2. A method according to claim 1, wherein the cut corresponding to said end line connecting said intermediate portion to the outside surface of the sheath is made first, said separator is removed, and then the cut corresponding to said end line connecting said intermediate portion to the inside surface of said sheath is made.

3. A method according to claim 1, for making a sheath in which said intermediate portion of the join plane includes at least two parts generally extending at least substantially transversely relative to the thickness of the wall of said sheath, and interconnected in pairs by respective junction lines extending at least substantially parallel to said thickness, wherein the method consists in:

interposing at least two separators between the successive layers of said flexible material, the thin sections of said separators corresponding to respective parts of said intermediate portion;
  then, after polymerizing the binder, forming cuts corresponding respectively to said end lines and to said junction lines of the section of the join plane.

4. A method according to claim 3, consisting in:

beginning by forming the cut which corresponds to said end line connecting the first of said parts to the outside surface of the sheath;
  removing the first separator;
  forming the cut corresponding to said junction line between said first and second parts;
  removing the second separator; and
  successively and analogously forming the cuts corresponding to the other junction lines and removing any possible third to last separators, and then forming the cut corresponding to said end line connecting the last of said parts to the inside surface of the sheath.

5. A method according to claim 1, wherein the outside shape of the mandrel is identical to the outside shape of an object to be protected, on which said sheath is installed by resiliently separating the lips of said slit.

6. A method according to claim 1, for making a flame-proof sheath, wherein the flexible material applied on said mandrel is a mat built up by superposing a plurality of layers of cloth made of carbonizable oxidized organic fibers and having at least one face covered with a silicone-based binder.

7. A method of making a sheath for insulating a volume from the environment outside it, the sheath comprising a longitudinal slit defining a join plane, said join plane forming a baffle whose section includes at least one intermediate portion extending generally at least substantially transversely to the thickness of the wall of said sheath, and two end lines extending at least substantially parallel to said thickness of the wall of said sheath, said end lines connecting respective ends of said intermediate portion to the outside surface and to the inside surface of said sheath, wherein the method comprises the steps of:

making a mandrel whose outside shape corresponds to the volume to be insulated;
  applying on said mandrel successive layers of a flexible material impregnated with a polymerizable binder that has resilient properties after polymerization;
  interposing at least one separator between the successive layers of said flexible material, said separator having a thin section corresponding to said intermediate portion of the join plane, said separator comprising two cooperating layers of rapid fastening means having cooperating loops and hooks;
  polymerizing said binder; and
  forming cuts corresponding respectively to said end lines of the section of the join plane, on either side of said separator.

8. A method according to claim 7, wherein the cut corresponding to said end line connecting said intermediate portion to the outside surface of the sheath is made first, the two layers of the rapid fastening means are separated from each other, and then the cut corresponding to said end line connecting said intermediate portion to the inside surface of said sheath is made.

9. A method according to claim 8, for making a sheath in which said intermediate portion of the join plane includes at least two parts generally extending at least substantially transversely relative to the thickness of the wall of said sheath, and interconnected in pairs by respective junction lines extending at least substantially parallel to said thickness, wherein the method consists in;

interposing at least two separators between the successive layers of said flexible material, the thin sections of said separators corresponding to respective parts of said intermediate portion, each separator being constituted by two co-operating layers of rapid fastening means having co-operating loops and hooks;
  then, after polymerizing the binder, forming cuts corresponding respectively to said end lines and to said junction lines of the section of the join plane.

10. A method according to claim 9, consisting in:

beginning by forming the cut which corresponds to said end line connecting the first of said parts to the outside surface of the sheath;
  separating the layers of the first separator;
  forming the cut corresponding to said junction line between said first and second parts;
  separating the layers of the second separator;
  successively and analogously forming the cuts corresponding to the other junction lines and separating any possible third to last separators; and then
  forming the cut corresponding to said end line connecting the last of said parts to the inside surface of the sheath.

* * * * *